3,492,278
Patented Jan. 27, 1970

3,492,278
ELASTOMERS FROM CYCLOPENTENE
Carl A. Uraneck and William J. Trepka, Bartlesville, Okla., assignors to Phillips Petroleum Company, a corporation of Delaware
No Drawing. Filed Oct. 27, 1966, Ser. No. 589,855
Int. Cl. C08f 5/00, 1/42
U.S. Cl. 260—93.1          8 Claims

ABSTRACT OF THE DISCLOSURE

Polypentenamers, which can be employed in applications for which other synthetic rubbers are suitable such as tire treads, are produced by contacting under polymerization conditions cyclopentene and a catalyst comprising at least one pentahalide of a metal selected from the group consisting of niobium, tantalum and mixtures thereof and at least one organoaluminum compound.

---

This invention relates to the polymerization of cyclopentene and the polymer resulting therefrom.

The polymerization of cyclopentene using a wolfram or molybdenum chloride in conjunction with organoaluminum to give a linear polymer known as a polypentenamer is disclosed in the art, Natta et al., Angew. Chem. Internat. Edit., 3, 723, 725 (1964). The catalyst system described by Natta produces a polypentenamer with a high proportion of gel.

It is an object of this invention to form an essentially gel free polypentenamer from cyclopentene.

In accordance with this invention cyclopentene is polymerized in the presence of a catalyst comprising (1) a niobium or tantalum pentahalide and (2) an organoaluminum compound, to yield an essentially gel free polypentenamer.

This result was totally unexpected since it is known that pentahalides of the Group V element vanadium in the presence of an organoaluminum compound will not polymerize cyclopentene, Natta et al., Angew. Chem. Internat. Edit., 3, 723, 725 (1964), and since the halides of the Group VI elements in the presence of an organoaluminum compound give a product containing gel.

The preferred halides are the pentachlorides and pentabromides of niobium and tantalum and mixtures thereof, more preferably the pentachlorides.

The preferred organoaluminum component of this catalyst system is represented by the formula $R_mAlH_n$ where R is selected from the group consisting of alkyl, cycloalkyl, aryl radicals, and any combination thereof, containing from 1 to 20 carbon atoms; $m$ is an integer from 1 to 3; $n$ is an integer from 0 to 2; and $m$ plus $n$ equals 3 (thus the component can be a triorganoaluminum compound or an organoaluminum hydride). Suitable compounds include trimethylaluminum, triethylaluminum, triisobutylaluminum, tri-n-hexylaluminum, tri(3,5,7-triethylnonyl) aluminum, tri - n - eicosylaluminum, tricyclopentaylaluminum, tricyclohexylaluminum, triphenylaluminum, methyldiphenylaluminum, ethyl-bis(3,5-di-n-heptylphenyl)aluminum, tribenzylaluminum, tri-1-naphthylaluminum, cyclohexyldiisopropylaluminum, tri-4-tolylaluminum, n-butyldihydroaluminum, dimethylhydroaluminum, ethylmethylhydroaluminum, diphenylhydroaluminum, benzyl-n-dodecylhydroaluminum, dicyclohexylhydroaluminum, methyl(cyclopentyl)hydroaluminum, 2,6-di-n-butyl-4-hexylphenyldihydroaluminum, n-amyl(benzyl)hydroaluminum, and the like.

The mole ratio of organoaluminum compound to niobium or tantalum pentahalide is preferably in the range from about 0.5:1 to 3:1, more preferably 1:1 to 2:1. The mole ratio of catalyst components chosen for a given polymerization is influenced by such factors as the pentahalide employed, the presence or absence of a diluent, polymerization temperature, and the like. The catalyst level is based on the organoaluminum compound and will generally be in the range of 15 to 150 gram millimoles of the organoaluminum compound per 100 grams of monomer.

The process of this invention can be conducted in the presence or absence of a diluent. Any diluent which is inert under the conditions of the reaction can be employed. Aliphatic, cycloaliphatic, and aromatic hydrocarbons containing from 4 to 10 carbon atoms per molecule can be employed. Examples of such hydrocarbons are n-pentane, n-butane, n-hexane isooctane, n-decane, cyclohexane, cyclopentane, methylcyclohexane, benzene, toluene, and xylene. Surprisingly the catalyst systems of this invention are specific for the polymerization of cyclopentene. No polymer is formed when other unsaturated cyclic compounds are substituted for cyclopentene; therefore unsaturated cyclic hydrocarbons such as cyclohexene, and cyclooctene are suitable as diluents. Also suitable as diluents are halogenated compounds such as chlorobenzene, tetrachloroethylene, and cis-1,2-dichloroethylene. Mixtures of any of these diluents can also be employed.

The polymerization time, and temperature and pressure can vary widely depending upon many variables. It is preferred that a relatively low polymerization temperature be employed. The temperature will generally be in the range of $-70$ to $+30$, preferably $-50°$ C. to $+10°$ C. The temperature can be varied during the course of the polymerization, if desired. While the polymerization time will depend partially upon the temperature, it will generally be in the range of about 1 minute to about 100 hours, preferably from 1 hour to 50 hours. The polymerization pressure should generally be that which is sufficient to maintain the reactants in a substantially liquid state.

The polymers prepared according to this invention can be separated from the polymerization reaction mass by any conventional method such as fractionation, steam stripping, coagulation, and the like. The separated polymers can then be washed and dried. Suitable additives such as reinforcing agents, antioxidants, vulcanizing agents, vulcanization accelerators, and the like can be incorporated into the polymer as desired. These polymers can be employed in many of the applications for which other synthetic rubbers are suitable, such as tire treads, hose, gaskets, coating compositions, stretch fibers, and the like.

EXAMPLE I

Cyclopentene was polymerized in the presence of two different catalyst systems, (1) niobium pentachloride with triisobutylaluminum and (2) tantalum pentachloride with triisobutylaluminum. Some runs were conducted in the absence of a diluent and in others cyclohexene was used as the diluent. Variable quantities of catalyst components were employed in the runs. The $NbCl_5$ or $TaCl_5$ was charged first under a stream of dry nitrogen. The temperature was regulated at $-30°$ C. and the cyclopentene was added followed by the triisobutylaluminum and then diluent, when used. The reactants were agitated at $-30°$ C. for 4 hours and then at $5°$ C. for 20 hours. Each polymerization mixture was shortstopped with a 4 weight percent solution of phenyl-beta-naphthylamine, the amount used being approximately 2 parts by weight per 100 parts by weight of monomer charged to the polymerization. The mixture was then diluted with toluene and the polymer was coagulated in isopropyl alcohol. The products were elastomers and were essentially free from gel. Results are presented in Table I.

TABLE I

| Run | 1[1] | 2 | 3 | 4 | 5 | 6 | 7 | 8 |
|---|---|---|---|---|---|---|---|---|
| Cyclopentene, parts by weight | 100 | 100 | 100 | 100 | 100 | 100 | 100 | 100 |
| Cyclohexene, parts by weight | 0 | 0 | 162 | 324 | 0 | 0 | 0 | 243 |
| Niobium pentachloride, mhm | 43.9 | 43.8 | 73.1 | 74.2 | | | | |
| Tantalum pentachloride, mhm | | | | | 48 | 48 | 34.8 | 56 |
| Triisobutylaluminum (TBA), mhm | 65.9 | 87.6 | 73.1 | 74.2 | 72 | 96 | 104 | 56 |
| TBA/MCl$_5$ mole ratio (M=Nb or Ta) | 1.5:1 | 2:1 | 1:1 | 1:1 | 1.5:1 | 2:1 | 3:1 | 1:1 |
| Inherent viscosity [2] | 3.43 | 3.40 | 3.86 | 1.61 | 1.70 | 1.57 | 0.65 | 2.17 |
| Gel, percent [3] | 0 | 0 | 0 | 0 | 0 | 0 | 0 | 0 |
| Unsaturation, percent [4] | 93.8 | 94.9 | | | | 94.4 | 95.4 | | mhm.=Gram millimoles per 100 grams monomer.

[1] Infrared spectrum as a film showed both cis and trans unsaturation in a ratio of about 1:2. No vinyl or methyl groups were detected.

[2] One tenth gram of polymer was placed in a wire cage made from 80 mesh screen and the cage was placed in 100 ml. of toluene contained in a wide-mouth, 4-ounce bottle. After standing at room temperature (approximately 25° C.) for 24 hours, the cage was removed and the solution was filtered through a sulfur absorption tube of grade C porosity to remove any solid particles present. The resulting solution was run through a Medalia-type viscometer supported in a 25° bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.

[3] Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, two-ounce bottle. A piece of folded quarter-inch hardware cloth in the bottom of the bottle supported the cage with minimum contact. The bottle containing the cage was weighed to the nearest 0.02 gram during a minimum three-minute draining period after which the cage was withdrawn and the bottle again weighed to the nearest 0.02 gram. The difference in the two weighings is the weight of the cage plus the toluene retained by it, and by subtracting the weight of the empty cage from this value, the weight of toluene retention is found, i.e., the cage calibration. In the gel determination, after the cage containing the sample had stood for 24 hours in toluene, the cage was withdrawn from the bottle with the aid of forceps and placed in the two-ounce bottle. The same procedure was followed for determining the weight of swelled gel as was used for calibration of the cage. The weight of swelled gel was corrected by subtracting the cage calibration. The cage, after removal from the two-ounce bottle, was placed in an aluminum weighing dish of known weight and the cage and dish were placed in a vacuum drying oven at 70–80° C. for one hour after which they were allowed to cool to room temperature and weighed. Subtracting the sum of the weights of the aluminum dish and the cage from the latter weighing gave the weight of the gel which was finally corrected for solution retention on the cage and for soluble polymer remaining within the gel structure.

[4] Based on original unsaturation of monomer, i.e., double bonds per 5 carbon atoms as determined by iodine monochloride titration. A 0.5-gram sample of polymer was dissolved in a 75/25 volume mixture of carbon disulfide and chloroform, a chloroform solution of iodine chloride of known concentration (approximately 0.09–0.10 molar) was added, the mixture was placed in a 25° C. bath for one hour to allow time for reaction, and the excess of iodine chloride was titrated with 0.05 N sodium thiosulfate. A blank was run using only solvent and iodine chloride and appropriate correction was made when calculating unsaturation.

Cyclopentene was polymerized using molybdenum pentachloride and triisobutylaluminum under conditions similar to those employed in the foregoing runs except that the time at −30° C. was 2 hours except in control 5 where it was 4 hours. The time at +5° C. was as indicated. The results are reported in Table II.

TABLE II

| Control | 1 | 2 | 3 | 4 | 5 |
|---|---|---|---|---|---|
| Cyclopentene, parts by wt | 100 | 100 | 100 | 100 | 100 |
| Cyclohexane, parts by wt | 0 | 0 | 0 | 195 | |
| Cyclohexene, parts by wt | | | | | 405 |
| Molybdenum pentachloride, mhm.[1] | 45 | 45 | 45 | 45 | 30 |
| Triisobutylaluminum (TBA)/MoCl$_5$ mole ratio | 1/1 | 2/1 | 3/1 | 3/1 | 3/1 |
| Inherent viscosity [2] | Gelled | | 1.33 | 1.98 | |
| Gel, percent [3] | | 70 | 56 | 59 | 67 |
| Time in 5° C. bath, hr | 1 | 3 | 5 | 19 | 20 |

[1] Gram millinoles per 100 grams of cyclopentene.
[2] Note 1, Table I.
[3] Note 2, Table I.

A comparison of the results of runs 1–8 of Table I with controls 1–5 of Table II reveals that a product containing substantial gel is produced using molybdenum halide plus an organoaluminum catalyst whereas with niobium or tantalum halides an essentially gel free polymer results. Furthermore, the polymer produced in accordance with the instant invention is characterized by having both cis and trans structures in a ratio of about 1:2. The unsaturation in the runs where this property was determined was about 93 percent to about 95 percent although it may be as low as 90 percent. Thus the cis unsaturation is generally at least 30 percent and the trans at least 60 percent. It is further characterized by having no detectable vinyl or methyl groups.

EXAMPLE II

Cyclopentene was polymerized in the absence of a diluent in a series of 11 runs in which the catalyst was niobium pentachloride and triisobutylaluminum. The procedure was the same as described in Example I. The recipe was as follows:

Cyclopentene, parts by weight _____ 100
Niobium pentachloride, mhm. _____ 38.1–61.1
Triisobutylaluminum, mhm. _____ 57.2–93.0
TBA/NbCl$_5$ mole ratio _____ 1.5:1

Products from the runs were elastomers. They were blended and physical properties (determined as shown in notes 1, 2 and 3, respectively, of Table I) of the blend were as follows:

Inherent viscosity _____ 2.61
Gel, percent _____ 0
Unsaturation, percent _____ 92.6

Infrared analysis indicated that the product contained approximately twice as much trans as cis polymer. There was no indication of the presence of either methyl or vinyl groups.

The polymer blend was compounded in a tread stock recipe and physical properties of the vulcanizate were determined. Results are presented in Table III:

TABLE III

Compounding recipe, parts by weight

Polymer blend _____ 100
High abrasion furnace black _____ 50
Zinc oxide _____ 5
Stearic acid _____ 2
Flexamine [1] _____ 1
Aromatic oil (Philrich 5) _____ 10
Sulfur _____ 1.75
Santocure NS [2] _____ 1.1

Cured 30 minutes at 307° F.

Compression set, percent [3] _____ 18.9
Tensile, p.s.i. [4] _____ 1000
Elongation, percent [5] _____ 150
ΔT, ° F. [6] _____ 106
Resilience, percent [7] _____ 66.5
Shore A hardness, 80° F. [8] _____ 72

[1] Physical mixture containing 65 percent of a complex diarylamine-ketone reaction product and 35 percent of N,N′-diphenyl-p-phenylenediamine.
[2] N-tert-butyl-2-benzothiazolenesulfenamide.
[3] ASTM D–395–61, Method B (modified). Compression devices are used with 0.325-inch spacers to give a static compression for the 0.5-inch pellet of 35 percent. Test is run for 2 hours at 212° F., plus relaxation for 1 hour at 212° F.
[4] ASTM D–412–62T.
[5] ASTM D–412–62T.
[6] ASTM D–623–62. Micro pellet used for test; gives high heat build-up values. Corresponding test made with solution polymerized polybutadiene rubber gave value of 122.4.
[7] ASTM D–945–59 (modified). Yerzley oscillograph. Test specimen is a right circular cylinder 0.7 inch in diameter and 1 inch high.
[8] ASTM D–1706–61. Shore Durometer, Type A.

The data from Example III reveal that the polymers produced in accordance with this invention are suitable for tire stock.

Two other unsaturated cyclic monomers, cyclooctene, and cyclooctadiene, were subjected to polymerization conditions similar to those of Example I except as noted below. The catalyst was a 1/1 mole ratio of niobium pentachloride and triisobutylaluminum. The reactants were agitated at −30° C. for 4 hours, at +5° C. for 20 hours, at +50° C. for 24 hours and at +70° C. for 6 hours. No polymer was formed in any of the runs.

A comparison of the above data with that from Example I reveals that the catalyst system of this invention selectively polymerizes cyclopentenes to the exclusion of other similar cyclic unsaturated monomers.

While this invention has been described in detail for the purpose of illustration, it is not to be contrued as limited thereby but is intended to cover all changes and modifications within the spirit and scope of the invention.

We claim:

1. A polymerization method comprising contacting under polymerization conditions cyclopentene and a catalyst comprising (1) at least one pentahalide of a metal selected from the group consisting of niobium, tantalum and mixtures thereof and (2) at least one organoaluminum compound represented by the formula $R_mAlH_n$ wherein R is selected from the group consisting of alkyl, cycloalkyl, aryl radicals and combinations thereof containing from 1 to 20 carbon atoms, inclusive; $m$ is an inter from 1 to 3, $n$ is an integer from 0 to 2, and the sum of $n$ plus $m$ equals 3.

2. The method according to claim 1 wherein said pentahalide is selected from the group consiting of niobium pentachloride and tantalum pentachloride.

3. The method according to claim 1 wherein said organoaluminum compound is triisobutylaluminum.

4. The method according to claim 1 wherein the mole ratio of organoaluminum compound to pentahalide is within the range of about 0.5:1 to 3:1 and said organoaluminum compound is present in an amount within the range of from about 15 to 150 millimoles per 100 grams of monomer.

5. The method according to claim 1 wherein the polymerization is carried out at a temperature in the range of from about −70° C. to about +30° C.

6. The method according to claim 1 wherein the polymerization is carried out in the presence of a substantially inert diluent.

7. The method according to claim 1 wherein the polymerization is carried out in the presence of a substantially inert diluent comprising an unsaturated cyclic hydrocarbon.

8. The method according to claim 2 wherein said organoaluminum compound is triisobutylaluminum, the mole ratio of organoaluminum compound to pentahalide is within the range of about 1:1 to 2:1, the organoaluminum compound is present in an amount within the range of from about 15 to about 150 gram millimoles per 100 grams of monomer, the temperature is within the range of −50° C. to +10° C., and the polymerization reaction is carried on for a time within the range of from about 1 hour to about 50 hours.

References Cited

UNITED STATES PATENTS 3,074,918    1/1963    Eleuterio _____ 260—93.1

OTHER REFERENCES

Natta et al., Angew, Chem. Internat. Edit. 3, 723, 725 (1964).

JOSEPH L. SCHOFER, Primary Examiner

R. A. GAITHER, Assistant Examiner